(12) United States Patent
Tafoya (10) Patent No.: US 6,983,604 B1
(45) Date of Patent: Jan. 10, 2006

(54) THERMODYNAMIC PRESSURE GENERATOR

(76) Inventor: Samuel Barran Tafoya, 135 41st Cir. E., Bradenton, FL (US) 34208

( * ) Notice: Subject to any disclaimer, the term of this patent is extended or adjusted under 35 U.S.C. 154(b) by 0 days.

(21) Appl. No.: 10/903,801

(22) Filed: Jul. 30, 2004

(51) Int. Cl.
*F02C 5/02* (2006.01)
*F02C 3/14* (2006.01)

(52) U.S. Cl. .............. 60/772; 60/39.34; 60/39.35; 60/805

(58) Field of Classification Search ............. 60/772, 60/39.34, 39.38, 249, 39.3
See application file for complete search history.

(56) References Cited

U.S. PATENT DOCUMENTS

| | | | | |
|---|---|---|---|---|
| 2,599,209 A | * | 6/1952 | Marks et al. ............. | 60/39.34 |
| 3,727,401 A | * | 4/1973 | Fincher .................... | 60/39.35 |
| 4,706,452 A | * | 11/1987 | Lavoie ..................... | 60/39.35 |
| 5,257,499 A | * | 11/1993 | Leonard .................... | 60/39.23 |

* cited by examiner

*Primary Examiner*—Charles G. Freay
(74) *Attorney, Agent, or Firm*—Dorothy S. Morse (57) ABSTRACT

A thermodynamic pressure generator having an oscillating valve that allows premixed fuel to enter a combustion chamber in turbulence, until it comes into contact with an annular spoiler, which converts a portion of the fuel into a Karmon vortex ring for delayed ignition. A continuous spark then ignites the remaining fuel with rapid pressure rise that kills the vortex. The fuel in the vortex goes from laminar to turbulence, adding fuel to the already burning charge, super charging it and permitting total ignition. Thus, present invention exhaust contains no polluting by-products and only sensible heat is released into the environment. Exhaust gases are released radially through turbine vanes having a shape that permits a relatively low rotational speed, with sufficient peripheral speed to create torque of considerable degree. Applications include, but are not limited to, land transportation vehicles, propeller-driven airplanes, and marine vessels.

20 Claims, 7 Drawing Sheets

THERMODYNAMIC PRESSURE GENERATOR

CROSS-REFERENCE TO RELATED APPLICATIONS

None

BACKGROUND OF THE INVENTION

1. Field of the Invention

This invention relates to the field of turbine engines, specifically to a thermodynamic pressure generator that has an oscillating valve allowing a premixed fuel charge to enter a combustion chamber in turbulence, until it comes into contact with two annular spoilers that convert a portion of the mixture into two Karmon vortex rings having laminar flow for delayed ignition. A continuous spark ignites the turbulent air/fuel mixture with rapid pressure rise that kills the formation of the vortex rings. The fuel mixture in the rings then goes from laminar to turbulence, adding fuel to the already burning charge, super charging it and permitting near total ignition. Thus, exhaust from the present invention contains no combustible gases or environmentally polluting by-products. The engine also provides its own cooling system, therefore releasing only sensible heat into the environment, that which feels warm to the sense of human touch, but not hot. The pressure rise also causes the oscillating valve to move toward its closed position, although its does not actually close, which allows for the next inflow of fuel mixture. The physical displacement of the oscillating valve during its movement is very small. Exhaust gases are released radially from the combustion chamber between turbine blades, which cause the rotor and output shaft rotation. The high velocity in which the expanding gases leave the combustion chamber causes a pressure drop in the center of the spheroid. This allows the oscillating valve to move toward its open position and allow a fresh premixed fuel/air charge to enter the combustion chamber. The present invention engine functions on pulsating combustion and incorporates an excess air to fuel mixture. The ignition/burning of the present invention never flames out, but instead creates a pulse effect, while at the same time permitting a peripheral speed for the turbine blades that is great enough to create torque of considerable force while creating a near steady pressure release at the blades. This is an open system. Thus, conventional transmissions, manual or automatic, can be used with the present invention engine. Advantages of the present invention engine include increased fuel efficiency, increased horsepower output, simple manufacture, low maintenance, easy access, adaptability to a variety of fuels, diminished environmental by-product and heat pollution, and diminished cost as the need for exotic metals and many engine parts are eliminated. For example, the present invention engine functions without catalytic converters, mufflers, radiators, heat exchangers, and other electronic devices used to control emissions since it has a pollution-free exhaust. Applications include, but are not limited to, land transportation vehicles, propeller-driven airplanes, and marine vessels.

2. Description of the Related Art

Conventional turbine engines typically burn a rich air/fuel mixture with incomplete combustion that creates polluting exhaust emissions. Their blades also rotate at high speeds, typically 40,000 rpm, resulting in a high temperature operation. Thus, conventional turbine engines usually require expensive precision reduction gears, explosion-proof safety shields, and blades made from high cost materials that do not lose their shape when subjected to the high temperatures generated. Since the blades/vanes of the present invention rotate at a much lower speed, expensive precision reduction gears and explosion-proof safety shields are not required, and its blades/vanes can be made from lower cost materials. The intent of the present invention is to produce cost effective and efficient rotary power, while providing a very clean exhaust by incorporating an excess air to fuel mixture. As a result of its more complete fuel combustion, the present invention engine is more cost effective to operate, it depletes energy resources at a much slower rate, and its emissions have significantly much less impact on the environment. Cost effective operation results from the present invention being able to burn a very lean air/fuel mixture, as well as the fact that the need for exotic metals and many engine parts is eliminated. Since the exhaust gases of the present invention engine have substantially reduced emissions, they are not combustible, and further, they are returned to the atmosphere at near ambient temperature, being only warm to the sense of human touch but not hot. There is no engine known with the same features and components as the present invention, nor all of its advantages.

BRIEF SUMMARY OF INVENTION—OBJECTS AND ADVANTAGES

The primary object of this invention is to provide a lightweight and compact thermodynamic rotary power pressure generator of high horsepower and great torque that would allow vehicles to accelerate with less fuel consumption. It is a further object of this invention to produce cost effective and efficient rotary power, while providing a very clean exhaust by incorporating an excess air to fuel mixture. A further object of this invention is to provide a turbine engine that has fewer components than conventional turbine engines and is therefore more durable, more economical to build, simpler to manufacture, and simpler to maintain and repair. It is also an object of this invention to provide a turbine engine that operates with near total combustion, thereby reducing exhaust heat and cooling heat as an energy loss. A further object of this invention is to provide a turbine engine that releases exhaust gases to the atmosphere that are at near ambient temperature and not combustible. It is also an object of this invention to provide a turbine engine that eliminates many of the parts/accessories required by conventional engines. It is a further object of this invention to provide a turbine engine with blades/vanes that rotate at lower speeds to eliminate the explosion risk inherent in high-speed turbine blade rotation. It is also an object of this invention to provide a turbine engine that is able to operate with a currently available standard automatic or manual transmission. It is a further object of this invention to provide a turbine engine that is able to operate with currently available starters, as well as conventional fuels and lubricants.

As described herein, properly manufactured and used, the present invention is a cost efficient turbine engine that depletes energy resources at a much lower rate than conventional turbine engines and also has a clean exhaust that creates much less an of impact on the environment. The rotor assembly of the present invention turbine engine is typically larger than those used in prior art turbine engines, allowing for a significantly reduced explosion risk since it can generate the torque it needs from a lower rotor assembly speed. Also, a lean fuel/air charge is used in the present invention turbine engine, and the Karmen vortex rings formed by two annular spoilers maintain a portion of the fuel/air charge in laminar to allow for delayed combustion of a portion of the original fuel/air charge that supercharges the remainder of the charge that is already burning in the combustion chamber to create a pulsating type of action that in the excess air to fuel charge environment permits near total combustion of the fuel/air mixture. The supercharging/pulsating combustion creates high horsepower so that land transportation vehicles, propeller-driven airplanes, and marine vessels are able to operate with less fuel consumption. The excess air to fuel charge and near total combustion creates a very clean exhaust, which in part contributes to a need for fewer components than conventional turbine engines and leads to simpler manufacture, maintenance, and repair. Cooling chambers positioned adjacent to the oil reservoir, and oil cooling fins, reduce exhaust heat and cooling heat as an energy loss, resulting in the release of exhaust gases to the atmosphere that are not combustible and near ambient temperature. It is an important difference between the present invention and conventional turbine engines that the exhaust gases of the present invention engine have substantially reduced emissions, are not combustible, and are returned to the atmosphere at near ambient temperature. The present invention is also cost efficient to operate as a result of the fact that it requires no special transmission, starter, fuel, or lubricant, and instead is able to work with standard products that are easily available.

While the description herein provides preferred embodiments of the present invention turbine engine, it should not be used to limit its scope. For example, variations of the present invention, while not shown and described herein, can also be considered within the scope of the present invention, such as variations in the size of the rotor and number of blades/vanes used; the ratio of fuel/air used for combustion; the size and configuration of the blade maintenance access cover plates; the type of material used for the oscillating valve; the number of igniters used; and the size and configuration of the oil reservoir used. Thus, the scope of the present invention should be determined by the appended claims and their legal equivalents, rather than being limited to the examples given.

DETAILED DESCRIPTION OF THE INVENTION

Figure 1:
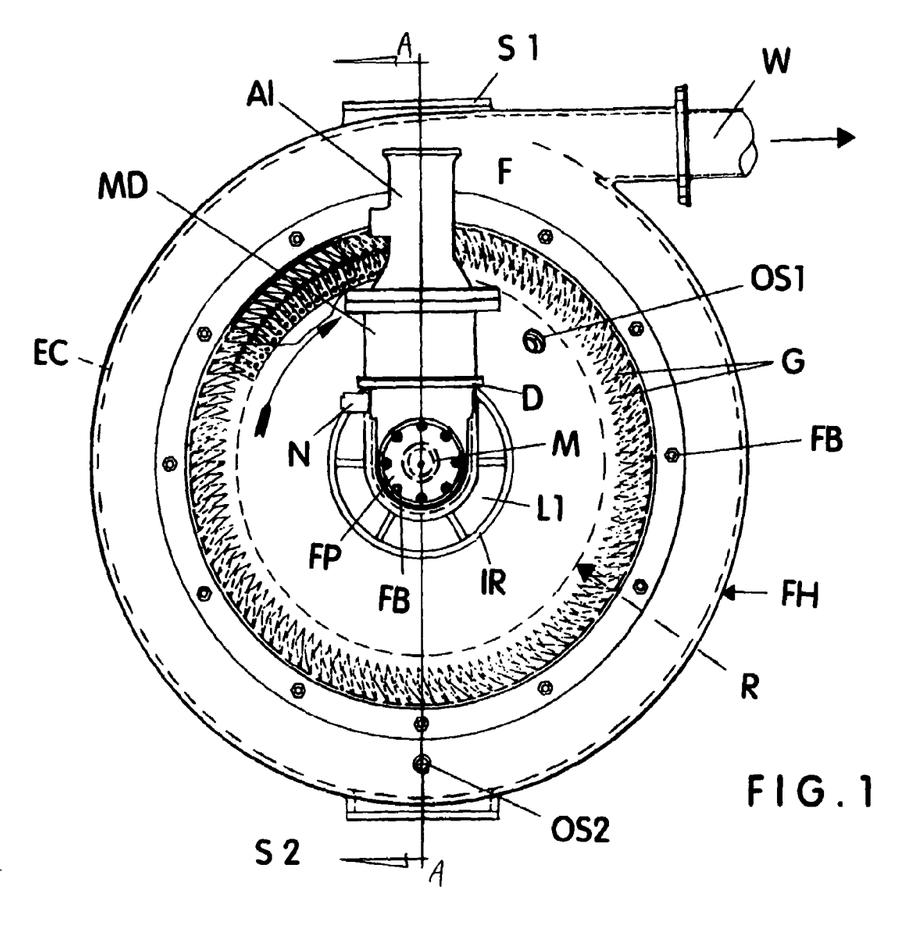
FIG. 1 is a front view of the most preferred embodiment of the present invention turbine engine.
Figure 2:
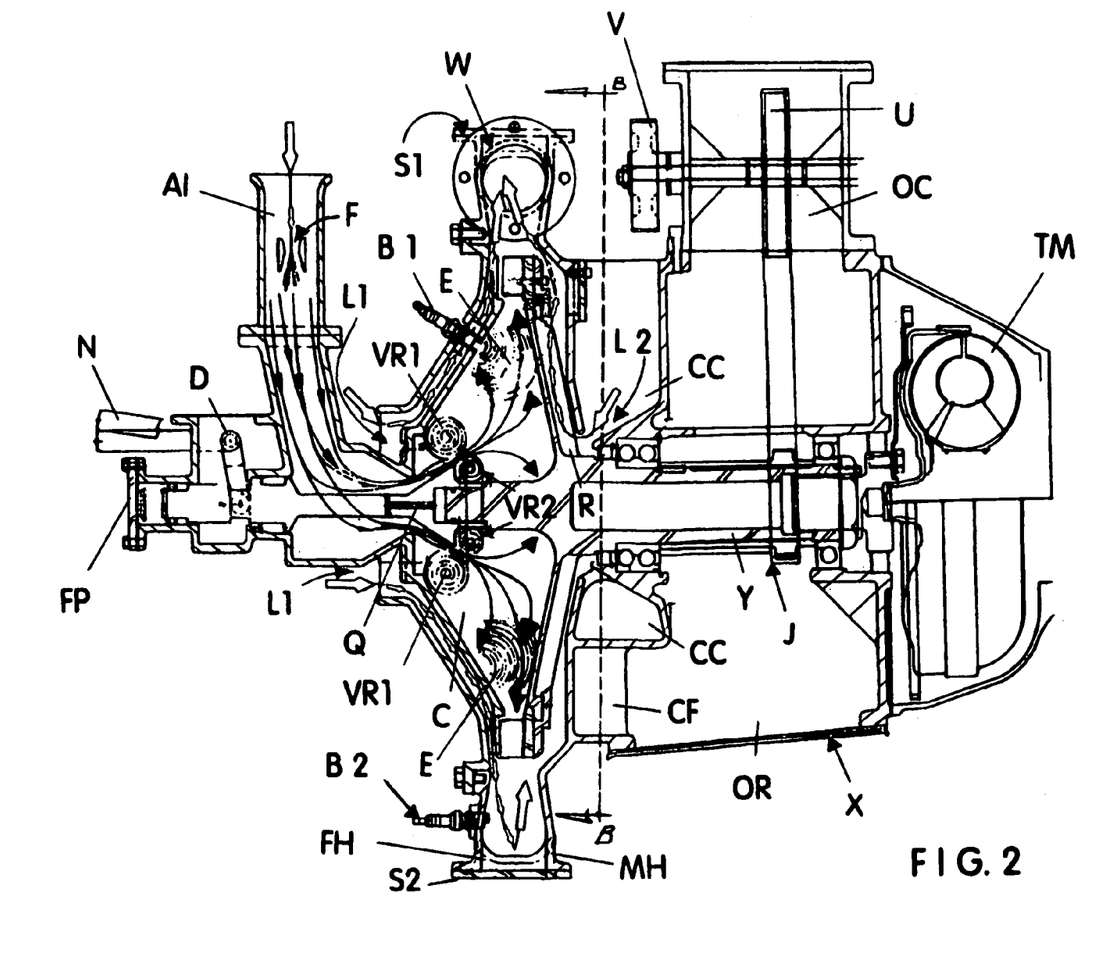
FIG. 2 is a sectional view of the most preferred embodiment of the present invention turbine engine, which is taken along the line A—A in FIG. 1, that shows the direction of fuel/air mixture flow and the positioning of the two oppositely spinning Karmen vortex rings, in addition to the flow of cooling air around the combustion chamber and into the exhaust chamber that collects the gases exiting the combustion chamber through the slots between the blades/vanes attaches to the peripheral edge of the rotor.
Figure 3:
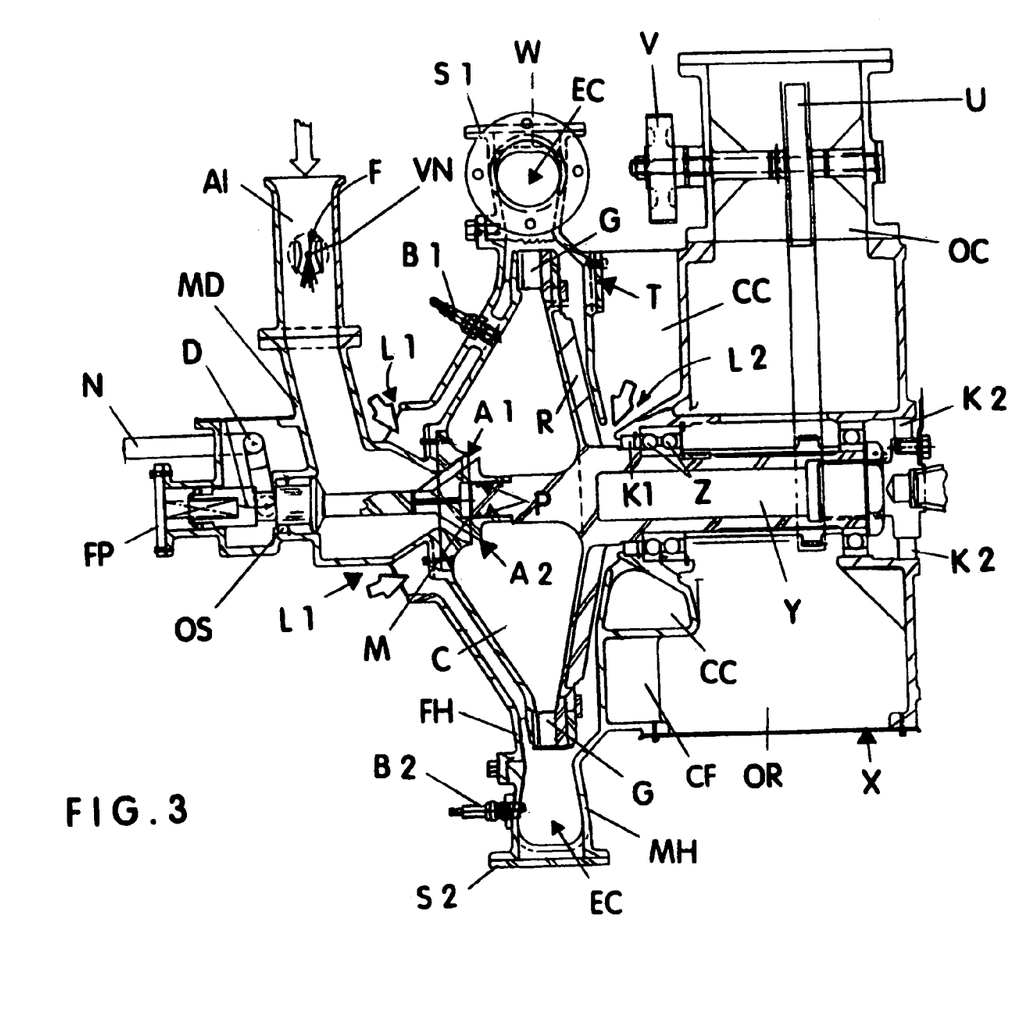
FIG. 3 is a sectional view of the most preferred embodiment of the present invention turbine engine, which is also taken along the line A—A in FIG. 1, but has no fuel/air mixture arrows, no cooling air arrows, and no Karmen vortex rings so that the structure and positioning of the two annular spoilers that are responsible for creating the two Karmen vortex rings can be more clearly visible.
Figure 4:
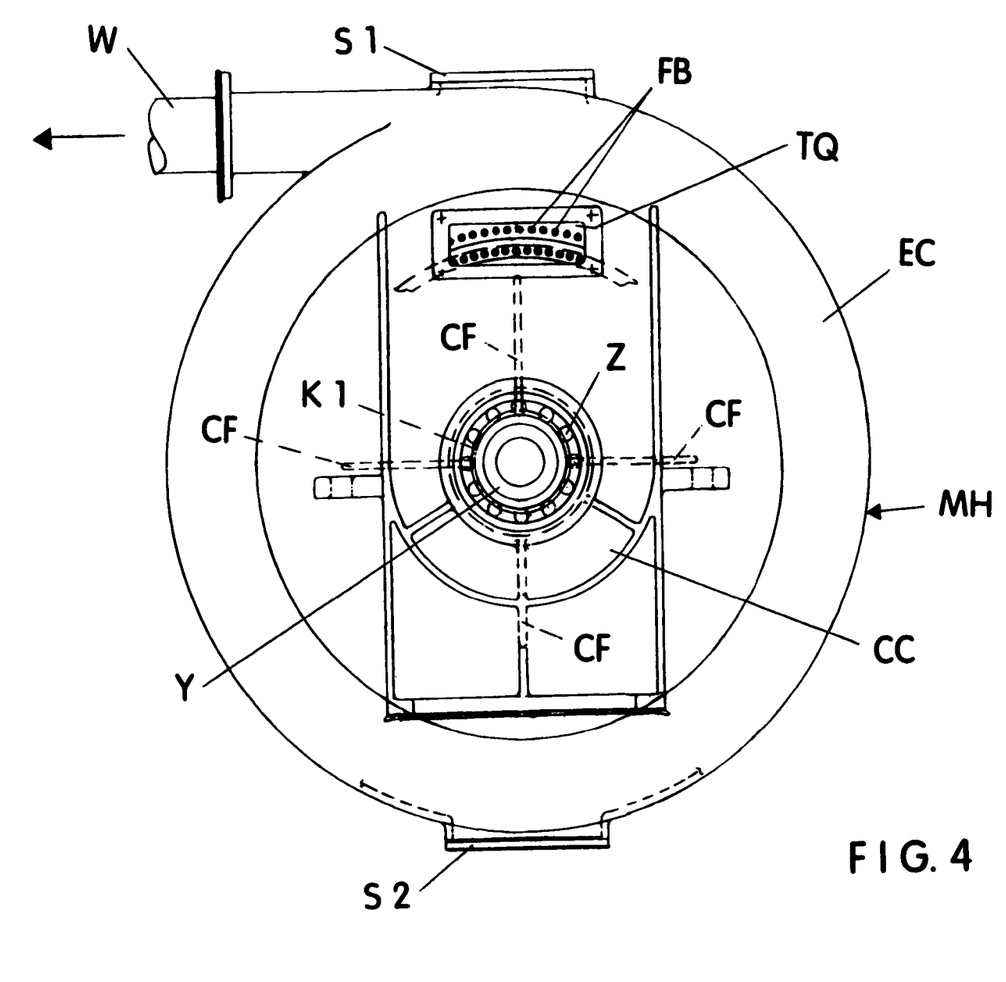
FIG. 4 is a sectional view of the most preferred embodiment of the present invention turbine engine, which is taken along the line B—B in FIG. 2, with the maintenance access plate removed to reveal the fastener bores that are used to secure the blades/vanes to the perimeter edge of the rotor.
Figure 5:
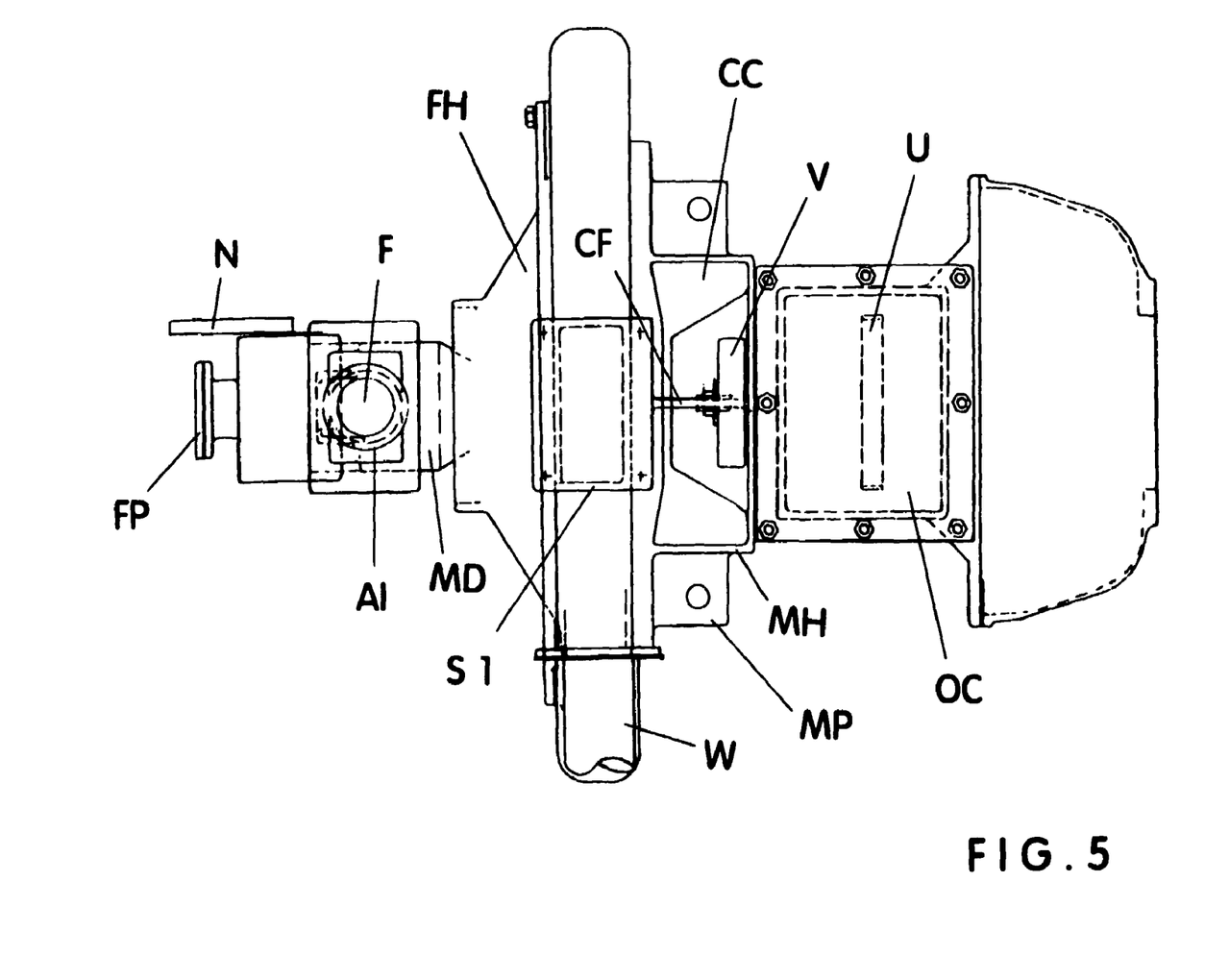
FIG. 5 is a plan view of the most preferred embodiment of the present invention turbine engine.
Figure 6:
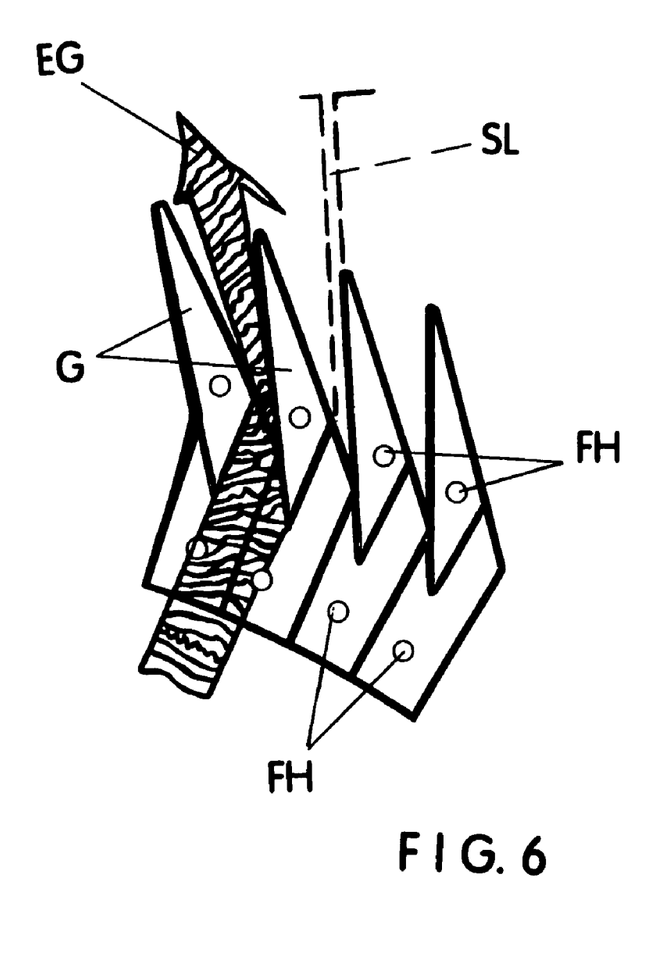
FIG. 6 is an enlarged front view of several of the blades/vanes shown in FIG. 1, with the direction of escaping gases shown through slots formed between adjacently positioned blades/vanes.
Figure 7:
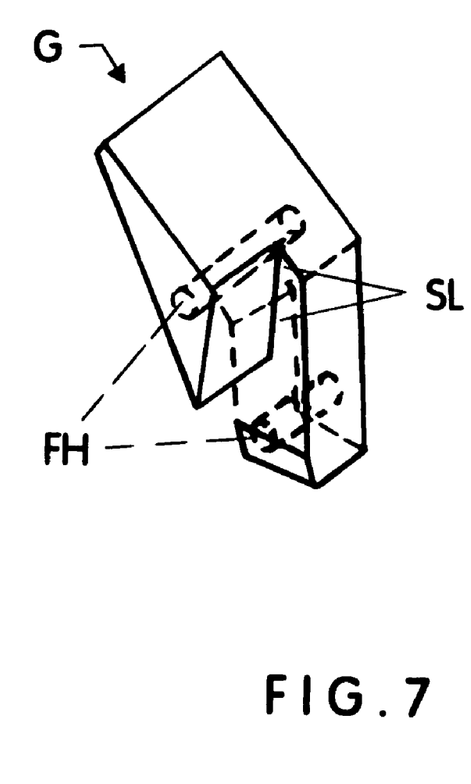
FIG. 7 is an enlarged perspective view of one of the blades/vanes shown in FIG. 6 having two fasteners holes therethrough.
Figure 8:
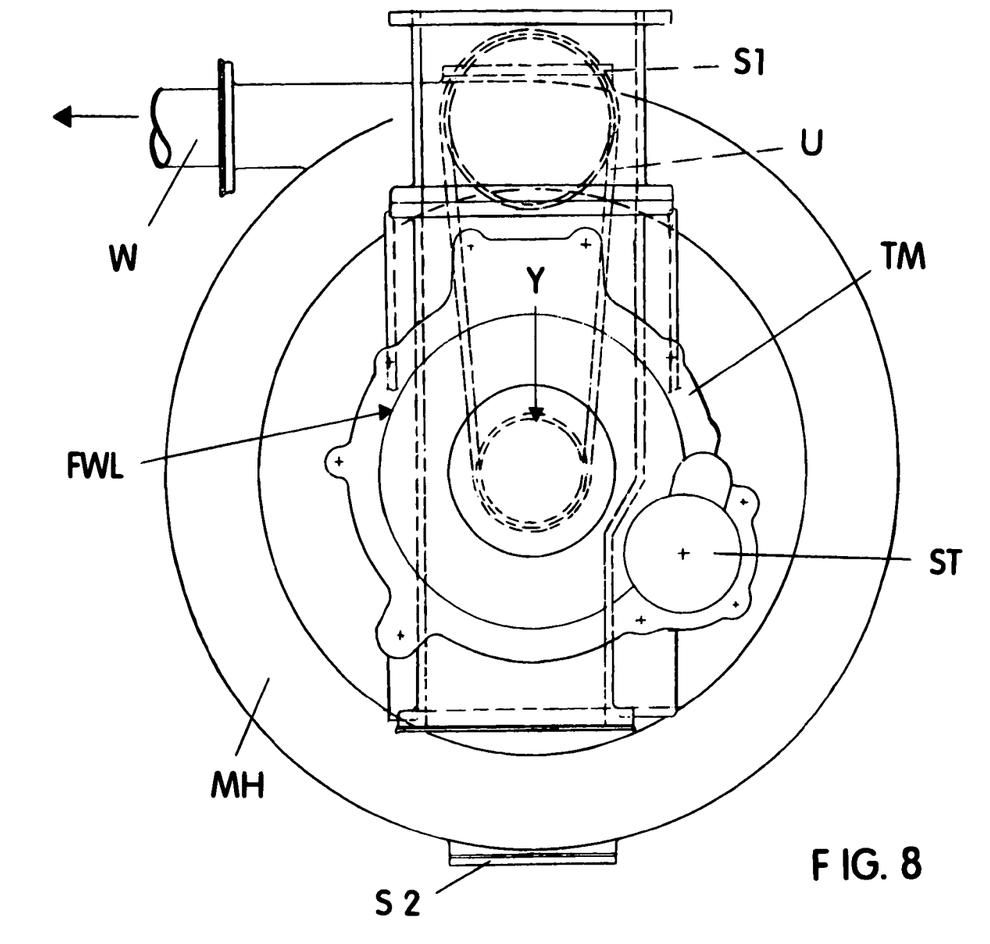
FIG. 8 is a rear view of the most preferred embodiment of the present invention turbine engine showing starter mount, transmission, and accessory drive.

FIGS. 1–3 show the most preferred embodiment of the present invention turbine engine having an oscillating valve M that allows a premixed fuel mixture (fuel mixture flow is shown by the arrows with solid arrowheads in FIG. 2) to enter a combustion chamber C in turbulence, until it comes into contact with the lips of two annular spoilers A1 and A2, which then convert a portion of the fuel/air mixture into laminar flow in the form of two Karmon vortex rings VR1 and VR2, for delayed ignition. When the remaining turbulent flow is ignited by a continuous spark from igniter B1, a rapid pressure rise occurs that simultaneously kills both vortex rings VR1 and VR2, and the fuel mixture therein goes from laminar to turbulence, adding fuel to the already burning charge E to supercharge it and permit near total ignition. Thus the exhaust gases of the present invention contain no combustible or environmentally polluting by-products. In addition, since the present invention turbine engine also provides its own cooling system, that includes oil reservoir OR, cooling chamber CC, and cooling fins CF, only sensible heat is released into the environment, that which is warm to the sense of human touch, but not perceived as being hot. After the pressure rise caused by fuel mixture ignition E occurs, oscillating valve M will move back in a direction toward front plate FP to achieve a lesser intake position, whereby inflow of fuel mixture into combustion chamber C slows. During its operation, oscillating valve M moves between its fully open and fully closed positions, but never actually attains either one. Instead, the amount of physical displacement achieved by oscillating valve M during its movement is small, and it appear to exhibit a vibrating motion. Clean exhaust gases (shown as EG in FIG. 6) are released radially in a 360° array through slots SL between closely positioned turbine blades/vanes G attached to the perimeter of rotor or power blade R, which cause blades/vanes G and the attached rotor or power blade R to rotate. The high velocity in which the expanding gases EG leave combustion chamber C causes a pressure drop in the center of the spheroid. This pressure drop allows the oscillating valve M to move toward its open position and thus allow a fresh charge of air to be drawn through air intake AI for mixing with fuel from fuel intake F that is injected into venturi VN, to create the premixed fuel mixture that is drawn through mixing duct MD and into combustion chamber C. In the excess air environment created in combustion chamber C, the ignition/burning E never flames out completely, but instead creates a pulse effect of approximately six hundred pulses per second. Advantages of the present invention engine are increased fuel efficiency, increased power output, simple manufacture, ease of installation, low maintenance, easy access for maintenance and repair, adaptability to different fuels including but not limited to fuel oil, diminished environmental by-products and heat pollution, and diminished manufacturing cost as the need for exotic metals and many engine parts are eliminated, such as but not limited to catalytic converters, mufflers, radiators, heat exchangers, and other electronic devices used to control emissions since it has a pollution-free exhaust. Applications include, but are not limited to, land transportation vehicles, propeller-driven airplanes, and marine vessels. FIG. 1 is a front view of the most preferred embodiment of the present invention turbine engine, while FIG. 5 shows it from the top and FIG. 8 shows it from the rear. Further, FIGS. 6 and 7 show enlarged views of the blades/vanes G observed in FIG. 1. FIGS. 2–4 are sectional views, with FIG. 2 showing the premixed fuel mixture flow pattern with arrows having solid arrowheads, as well as the vortex rings VR1 and VR2 caused by the annular spoilers A1 and A2 (that are more clearly visible in FIG. 3). FIG. 2 also has hollow arrows showing the flow of cooling air between front air inlet L1 and exhaust chamber EC, as well as the cooling air flowing between the rear air inlet L2 and exhaust chamber EC shown in FIG. 3). FIG. 4 shows the turbine shaft Y with its bearings Z and engine cooling features that include cooling chamber CC, cooling fins CF, oil reservoir OR, and oil cooler OC.

FIG. 1 is a front view of the most preferred embodiment of the present invention turbine engine that produces efficient rotary power while providing very clean exhaust gases. Excess air to fuel mixture is used in the present invention, so that a lean or very lean burn is possible. When the present invention turbine engine warms up, it can be leaned to the point that shock ignition E starts up, with the shock ignition E being harnessed and used for the engine's main propulsion. Also, the revolution of blades/vanes G is relatively low when compared to the forty thousand revolutions per minute speed of conventional turbine engine blades/vanes. The low speed of approximately six thousand revolutions per second for the blades/vanes G used in the present invention and its use of an excess air/fuel mixture make possible the use of conventional transmissions, manual or automatic. Further, with the present invention turbine engine there is no need for catalytic converters, mufflers, radiators, heat exchangers, or the multitude of electronic devices used to control emissions. Each cycle of the present invention engine has a life span of one-one-hundredths of a second or less, wherein over one hundred, and perhaps even as many as six hundred, cycles a second can occur to create a pulsing combustion with very little energy loss, and since this is an excess air engine, when combustion is complete the exhaust temperature will be merely sensible heat. The manner in which the present invention produces high energy releasing rotary power is the following. As the rotor or power blade R is revolved in cranking, the residual gases EG (as shown in FIG. 6) in the combustion chamber C are removed by centrifugal force and a low pressure is created at the center of combustion chamber C. Oscillating valve M is moved rearward, allowing a premixed fuel mixture (shown by the arrows with solid arrowheads in FIG. 2) to enter mixing duct MD (shown in FIG. 3) from air intake AI, after fuel is introduced into air intake AI via fuel intake F and travels through venturi VN. From mixing duct MD, the premixed fuel mixture moves toward combustion chamber C. As it passes over oscillating valve M, its flow is in turbulence until it comes into contact with the lips of two annual spoilers A1 and A2 that convert a portion of the fuel mixture to laminar in the form of two Karmen Vortex Rings VR1 and VR2. As the portion of the fuel mixture still in turbulence travels toward igniter B1, it is now ready to be ignited. As this small turbulent flow is ignited, it acts as a nucleus for total ignition with a rapid pressure rise, causing oscillating valve M to continue its oscillating motion that repeatedly allows new charges of fuel mixture to enter combustion chamber C for alternating supercharging pressure rise and the formation of vortex rings VR1 and VR2. The exhaust gases EG resulting from ignition E leave combustion chamber C and are released radially through the blades/vanes G attached to the perimeter of rotor or power blade R to start the rotation of rotor or power blade R and its attached shaft Y. The high velocity in which the expanding exhaust gases EG leave combustion chamber C causes a pressure drop at the center of the spheroid, allowing oscillating valve M to again move toward its open position so as to bring in a fresh charge of premixed fuel mixture. Pulsating combustion has now been started, with an out-of-phase flow between induction and exhaust. These fluctuations can become so large that gases are blown back through the inlet nozzle of fuel intake F, causing oscillating valve M to shut off such flow. As the present invention system continues to operate, it becomes a pulse jet engine. It takes in fuel mixture automatically during the small displacement pulsing operation of oscillating valve M when there is negative pressure in combustion chamber C, with no assistance from a blower. In contrast, when combustion is taking place and positive pressure exists in combustion chamber C, oscillating valve M moves in a closing direction to reduce the inflow of fuel mixture into combustion chamber C, although its oscillating motion never allows it to reach a fully closed position during engine operation. Any high-grade gas energy becomes sensible heat, as there are no provisions made in the present invention engine to conduct such energy away from the gas. This is in contrast to the plenum chambers in conventional turbines, which cause the deceleration of gases and increases in temperature due to the conversion of kinetic energy to heat. As a result of the rapid heating up of the gases in combustion chamber C, pressure is increased and combustion products now expand toward the outer periphery of combustion chamber C, resulting respectively in very high gas velocity and the generation of a rotation reaction in combustion chamber C that is translated to turbine shaft Y as a result of the exhaust gases EG passing through the slots SL between the blades/vanes G attached to the periphery of rotor R. Thus, the same direction of gas rotation within combustion chamber C is imparted to exhaust gases EG as they exit combustion chamber C, and further to rotor or power blade R. The system is now a heat engine, wherein heat is transformed into kinetic energy with the expansion of outflowing gases EG. This expansion process has with it a pressure and temperature drop, and it is important that exhaust pipe W be configured so that it does not restrict the handling of exhaust gases EG at any point. Since the present invention engine is designed to function on pulsating combustion, the lips of annular spoilers A1 and A2 are used within combustion chamber C to internally increase the intensity of the pulsations. As the fuel mixture passes by them, the lips of the annular spoilers A1 and A2 (seen most clearly in FIG. 3) peel off a portion of the fuel mixture into a coiled laminar flow in the form of two Karmen Vortex Trails or rings VR1 and VR2, as shown in FIG. 2, wherein the fuel mixture particles move in curved paths within the coil of each vortex ring VR1 and VR2 without mixing with the other. The velocity of gases in vortex rings VR1 and VR2 is too fast to ignite. The purpose of the vortex ring VR1 and VR2 formation is to cause intermittent retardation and acceleration of combustion. Therefore, as the inlet gases in the fuel mixture entering fuel intake F move into combustion chamber C, some of the gases will be formed into the laminar coiled paths of two vortex rings VR1 and VR2 by vortex ring generators in the form of the lips of two annular spoilers, A1 and A2, similar to the formation of a smoke ring or the annular muzzle flash of a naval gun. The vortex rings VR1 and VR2 then radiate in expanding laminar ring formation within combustion chamber C, and as vortex rings VR1 and VR2 grow larger in diameter the gas particles within them acquire a high velocity on the curved paths they travel, continuing to remain in laminar and unavailable for ignition. These rings VR1 and VR2 of fresh fuel mixture are thus growing amidst hot burning fire gases, which have no possibility of penetrating into the rings VR1 and VR2 due to the laminar character of its flow. Burning 11 particles are therefore prevented from coming into contact with non-ignited fuel mixture particles in the vortex rings VR1 and VR2, which causes combustion within combustion chamber C to become retarded during vortex ring VR1 and VR2 formation. As a consequence of retarded combustion, pressure drop in combustion chamber C is accelerated, with a corresponding acceleration of fuel mixture flow through fuel intake F. This will naturally cause more laminar flows in the form of additional vortex rings VR1 and VR2 to form, with retarded combustion thus improving the conditions of vortex ring VR1 and VR2 formation. As long as the fuel mixture flows laminarly into the growing vortex rings VR1 and VR2 within combustion chamber C, ignition of the fuel within the vortex ring formations VR1 and VR2 is delayed. At a certain point however, vortex rings VR1 and VR2 become fully grown, stop expanding, and break away from the lips of annular spoilers A1 and A2. Burning hot ignited gases E from combustion chamber C, instead of fresh fuel mixture, begin entering the bodies of vortex rings VR1 and VR2 and cause the fuel mixture therein to break away and join the main burning gases E, and thereafter violently burn. Ignition is caused by transportation of activated/ignited particles E into the charge in vortex rings VR1 and VR2 along its spiraling paths. The vortex rings VR1 and VR2 explode when only a small percentage of the chemical energy in them remains in the form of vortex energy, with such remaining vortex energy decaying into heat. As vortex rings VR1 and VR2 start to burn, combustion products rapidly expand and pressure in combustion chamber C greatly increases. The increased pressure reverses the direction of movement of oscillating valve M toward front plate FP, which causes a decelerated flow of the fuel mixture into combustion chamber C. Consequentially, the decelerated flow of the fuel mixture into combustion chamber C helps the vortex rings VR1 and VR2 to break up, causing the pulsations to be intensified with much more powerful energy release as the energy in vortex rings VR1 and VR2 joins that of the primary ignition. Since vortex rings VR1 and VR2 create a compressor effect, the combustion process in combustion chamber C is complete, and losses due to friction, turbulence, and radiation are minimal. The inlet pressures and expansion pressures within combustion chamber C are automatically out-of-phase. Since the type of energy release from combustion chamber C is sensible heat, metals used therein and for blades/vanes G would not have to be thermoset, nor be exposed to thermo senescence conditions. Further, the excess air supplied for cooling through air inlets L1 and L2, that are directed to exhaust chamber EC, would provide the necessary conditions for carbon monoxide and hydrocarbon elimination. Also, the sensible heat produced by the present invention thermodynamic pressure generator, wherein thermodynamic heat turns a shaft to produce horsepower, is more constant and much lower in temperature than that produced in conventional turbine engines. Further, nitrous oxide gases are better controlled at lower temperatures, or even eliminated. The cool exhaust of the present invention would be similar to the cool exhaust pipe of the VI bomb of World War II, which was a pulse jet and relatively cool considering its heavy two metric ton load. The fact that cooling air can be introduced via air inlets L1 and L2 during primary combustion, gives the present invention turbine engine longevity and reliability. The high peripheral rotor R speed with a relatively slow speed for attached turbine shaft Y, allows the present invention turbine engine to run without the precision reduction gears required for conventional turbine engines which use 40-1 reduction gears. Instead, a less expensive true automatic gearshift type of transmission can be used with the present invention, such as transmission TM shown in FIGS. 2 and 8, with the capacity to run any gear for any given time, such as but not limited to the 1951–1955 Hydramatics. The present invention also has the advantage of its rotor or power blade R being able to be throttled down, as in any piston type engine. Although not shown, it is preferred for the fuel induction of the present invention to consist of a throttle body device without a throttle plate, thereby establishing a constant pressure with adiabatic effect. Another important aspect of the present invention is that a vacuum is produced at the venturi (shown as VN in FIG. 3) where the fuel from fuel intake F is atomized for induction. Cooling of the present invention can be internal, and lubrication selection is not limited in scope as it can be of a vapor type, spray, or integral with the associated transmission. Also, although not critical, an overspeed control D is a preferred feature of the present invention to govern the speed of rotor or power blade R, and is controlled by lever N shown in FIGS. 1 and 2. To shut down the present invention turbine engine, the fuel supply from fuel intake F must be shut off. Further, piston seals K1 and K2 are shown in FIG. 2, which are contemplated to be made from magnetic material that is capable of turning at least six thousand revolutions per minute and have a useful life far greater than conventional seals. Effectively, pressures for piston seals K1 and K2 up to 500 psi and diameter variation is of no penalty. The thermal molecular agitation or Brownian motion experienced by piston seals K1 and K2 keep their molecules from settling or coalescing, as iron filings typically do in a magnetic field. Thus, the piston seals K1 and K2 used in the present invention are very adaptable to the intended use, as they are unaffected by gravity, centrifugal force, and much higher temperatures than those to which they will be subjected with the present invention.

The present invention does not require regenerator cores, compressors, fuel control devices, heavy insulation, expensive internal reduction gears, auxiliary lube pumps or oil coolers, other than the cooling that takes place through oil reservoir OR, shown in FIGS. 2 and 3. Further, cooling air that is induced into the exhaust stream from air inlets L1 and L2, is subject to centrifugal action of rotor R and exhaust gases EG. Therefore, a pressure gradient is overcome through stratified flow. In addition, the angle of each blade/vane G is calculated to exit exhaust gases EG at preferred velocities of MK6 (approximately 4,200 mph) and have a preferred rotational speed of approximately 5,800 rpm. However, the angles of blades/vanes G can be adjusted to different specifications according to the intended application. Also, exhaust gas EG velocities may achieve higher speeds should the resonator efficiency of the vortex ring producing annular spoilers A1 and A2 be changed. Under laboratory conditions vortex producing annular spoilers A1 and A2 have demonstrated a twenty percent thermal efficiency at the blades/vanes G, a fifty percent hydraulic efficiency in the combustion chamber C spheroid with the resonator efficiency then being the product, and a ten or fifteen percent to approximately thirty percent gas turbine efficiency at about 1200° F., without regeneration. The present invention must be regarded as a reciprocating engine. When the inlet temperature of the combustible mixture is increased, it naturally becomes thermodynamically less efficient. However, when Bernoulli's law of moving gases is applied and it is expected for the temperature and pressure of a fluid to be decreased as its velocity is increased, the inlet fluid temperature of the present invention engine becomes decreased by the acceleration of the inlet air. Further, the blades/vanes G are designed for anti-shockwave function, and they will not produce a stall condition as conventional airfoil shaped vanes do when shock ignition is produced at a constant rate with super sonic velocities. The preferred blades/vanes G of the present invention are shown in more detail in FIGS. 6 and 7.

FIG. 1 shows the front end of the present invention turbine engine having a front housing FH with a substantially circular cross-sectional configuration and a concentric substantially circular rotor or power blade R that is preferably close to eighteen inches in diameter when one hundred and twenty blades/vanes G are used. The outer perimeter edge of rotor or power blade R is shown in broken lines, as it is positioned behind front housing FH. FIG. 1 also shows one hundred twenty blades/vanes G of identical configuration, with most being illustrated in broken lines to indicate that they are attached to rotor or power blade R behind front housing FH. However, a few blades/vanes G are illustrated in non-broken lines simply as a means of more clearly illustrating the relative positioning of blades/vanes G to rotor or power blade R. The large directional arrow in the left central portion of FIG. 1, shows the direction of rotation for rotor or power blade R. Should rotor or power blade R be made with a different diameter dimension, a different number of blades/vanes G would be used. The configuration of blades/vanes G is shown in more detail in FIGS. 6 and 7. FIG. 1 also shows an upper blade access plate S1 being positioned above blades/vanes G for maintenance and/or replacement of blades/vanes G, and a lower blade access plate S2 being positioned below blades/vanes G for retrieval of any blades/vanes G dropped during maintenance activity. FIG. 1 further shows one sparkplug opening OS1 through rotor or power blade R, for the insertion of igniter B1, and a second sparkplug opening OS2 through the lower portion of front housing FH, for the insertion of an optional second igniter B2 that may be used in some applications. Concentric to rotor or power blade R and positioned centrally to the interior rim IR of rotor or power blade R, FIG. 1 shows front cooling air inlet L1, which is shown in FIG. 2 in a position immediately to the left of vortex ring VR1. Also, centrally in front of rotor or power blade R and extending upwardly from air inlet L1, FIG. 1 shows air intake AI and the fuel mixing duct MD immediately below it, that acts as an atomizing chamber to disperse/diffuse the air/fuel mixture into fine particles. The atomized fuel/air charge is drawn from mixing duct MD into combustion chamber C. Anterior to air intake AI and fuel mixing duct MD, FIG. 1 further shows the present invention's overspeed control D, with its control lever N, and the front plate FP connected to the anteriormost portion of front housing FH, that is shown in more detail in FIG. 2. Front plate FP is concentrically positioned relative to front housing FH and rotor or power blade R, with oscillating valve M also concentrically positioned within front housing FH and shown in broken lines to indicate positioning behind front plate FP. The number of fastener bores FB shown in FIG. 1 for the attachment of front plate FP to front housing FH, as well as those securing front housing FH in place, are not critical and can vary from the number, relative size, and positioning shown in FIG. 1. Positioned between the outer perimeter of front housing FH and blades/vanes G, and with its outer wall being indicated by the circular broken line adjacent to the outer perimeter of front housing FH, FIG. 1, shows exhaust chamber EC which connects upper blade access plate S1 to exhaust pipe W. Exhaust gases EG exiting combustion chamber C through the slots SL between blades/vanes G move into the annular exhaust chamber EC where they are mixed with cooling air from air inlets L1 and L2 before entering exhaust pipe W. The arrows with solid arrowheads in FIG. 2 show the movement of the fuel/air mixture into and through combustion chamber C, while hollow arrows show the cooling air being drawn from the air inlet L1 positioned in front of blades/vanes G through front housing FH, and also from the air inlet L2 positioned rearward from blades/vanes G through main housing MH, that is mixed in exhaust chamber EC with the exhaust gases EG leaving combustion chamber C through the slots SL between blades/vanes G. The vertically extending line A–A centrally in FIG. 1 indicates the section illustrated in FIG. 2.

FIG. 2 shows the most preferred embodiment of the present invention thermodynamic pressure generator having a front housing FH connected to a main housing MH, with a combustion chamber C located centrally therebetween. A rotor or power blade R is positioned rearward from combustion chamber C, with a plurality of individual blades/vanes G secured to and outwardly depending from the perimeter edge of rotor or power blade R. FIG. 2 further shows igniter B1 being inserted through front housing FH with its igniting end in communication with combustion chamber C. Positioned forward of front housing FH is an air intake AI with an open upper end. As atmospheric air (shown by the hollow arrow positioned at the top of air intake AI) moves downward through air intake AI, atomized droplets of fuel from fuel intake F are drawn into a venturi VN within air intake AI. The excess air to fuel mixture then moves through mixing-duct/atomizing-chamber MD positioned below air intake AI, and from there into combustion chamber C when permitted to do so by oscillating valve M. The lips of annular spoilers A1 and A2 are positioned at the entrance to combustion chamber C so that as the fuel/air mixture passes by them, a portion of the fuel/air mixture is formed into laminar coiled paths to create two oppositely rotating Karmen vortex rings VR1 and VR2, an outer one and an inner one, respectively with the lip of annular spoiler A1 creating vortex ring VR1 and lip of annular spoiler A1 creating vortex ring VR2. The three series of hollow arrows in FIG. 2 show cooling air movement through the present invention turbine engine from air inlet L1 in front of conbustion chamber C and air inlet L2 positioned rearward from combustion chamber C, while arrows with solid arrowheads show the flow of fuel/air mixture through mixing duct MD, through combustion chamber C, and into exhaust chamber EC. As can be seen in FIG. 2, two vortex rings VR1 and VR2 coiling in opposite directions form at the entrance to combustion chamber C, once the fuel/air mixture has moved beyond oscillating valve M. However, only a portion of the fuel/air mixture is formed into the two Karmen vortex rings VR1 and VR2, and the arrows with solid arrowheads show a majority of the remaining fuel/air mixture moving toward igniter B1. Since the fuel/air mixture moving toward igniter B1 is in turbulence, it is ignited, while the fuel in vortex ring VR1 and secondary vortex VR2 is in laminar and cannot be ignited while it remains in a laminar state. Ignition for the fuel in vortex rings VR1 and VR2 is thus delayed, creating a pulsating combustion. As the vortex rings VR1 and VR2 increase in size, hot burning gases E ignited by igniter B1 begin entering the bodies of vortex rings VR1 and VR2 and cause vortex rings VR1 and VR2 to simultaneously break away and join the main burning gases E. As the fuel in vortex rings VR1 and VR2 joins main burning gases E, its flow is changed from laminar to turbulence and it is violently ignited. The pressure rise within combustion chamber C moves oscillating valve M toward a closed position, and all exhaust gases EG are directed radially at high velocity through slots SL (shown in FIG. 7) between the blades/vanes G secured to the perimeter of rotor or power blade R. The rotating exhaust gases EG within combustion chamber C cause rotor or power blade R to rotate as they move between the blades/vanes G attached to the periphery of rotor or power blade R, which causes the turbine shaft Y centrally positioned within main housing MH to turn in the same direction. After passing through the slots SL between blades/vanes G, exhaust gases are collected in an annular exhaust chamber EC between front housing FH and main housing MH, which communicates with exhaust pipe W. The high velocity at which exhaust gases EG leave combustion chamber C causes a pressure drop that allows oscillating valve M to move toward its open position and allow a fresh premixed fuel/air charge to enter combustion chamber C and form new vortex rings VR1 and VR2. The actual displacement of oscillating valve M is quite small as the pulsing within combustion chamber C that controls its movement generally occurs at least approximately one hundred times per second and more commonly approximately six hundred times per second. FIG. 2 also shows an optional second igniter B2 positioned below combustion chamber C, with its igniting end inserted through front housing FH and communicating with annular exhaust chamber EC. It is contemplated for igniters B1 and B2 to each produce a continuous spark. The intended application would dictate whether igniter B2 is used. Although the blades/vanes G in the present invention turbine engine are designed for longevity, they are expected periodically to require replacement. Lower blade access plate S2 is in a position inferior to second igniter B2. FIG. 2 also shows an upper blade access plate S1 adjacent to exhaust pipe W. Blade access plates S1 and S2, as well as blade maintenance cover plate T (shown in FIGS. 2 and 3 but only identified by the letter 'T' in FIG. 3) positioned behind the upper portion of combustion chamber C, are used for inspection and replacement of blades/vanes G. Thus, instead of requiring a nearly complete engine dismantling that would be needed for blade or vane replacement in most prior art turbine engines, once upper access plate S1 and maintenance access plate T are removed and the worn or damaged blades/vanes G in the present invention turbine engine are identified, blade/vane G installation is a simple two-screw replacement process. Removal of lower access plate S2 is required only when a blade/vane G falls and needs to be retrieved prior to subsequent engine operation. Through the use of three series of hollow arrows, FIG. 2 also shows cooling air entering the present invention turbine engine between front housing FH and the front wall of combustion chamber C through cooling air inlet L1, with additional air entering the present invention turbine engine behind combustion chamber C through cooling air inlet L2. Atmospheric air is drawn into air inlet L1 by the rotation of rotor or power blade R. The final destination of the cooling air represented by these hollow arrows is the annular exhaust chamber EC, from which it travels with the exhaust gases EG exiting from combustion chamber C through exhaust pipe W. Positioned forward from air intake AI and mixing duct MD, FIG. 2 shows an overspeed control D with a connected speed control lever N. Front access plate FP is shown positioned below speed control lever N. Extending rearwardly from rotor or power blade R, FIG. 2 shows turbine shaft Y. Bearings Z and magnetic seals K1 and K2 (identified only in FIG. 3, although also shown in FIG. 2) help to maintain oil seals for turbine shaft Y. Above and below the forward portion of turbine shaft Y, FIG. 2 shows a cooling chamber CC, with a cooling fin CF positioned under cooling chamber CC. Also, above the central and rear portions of turbine shaft Y, FIG. 2 shows an oil cooler OC, with an oil reservoir OR positioned below the central and rear portions of turbine shaft Y. FIG. 2 shows chain U extending centrally through oil cooler OC, with its lower end engaging the rear portion of turbine shaft Y and the upper end of chain U directing the rotation of an auxiliary take-off V for accessories (not shown). The lower end of chain U extends below the oil level J in oil reservoir OR and carries oil (not shown) with it for lubrication/cooling purposes. FIGS. 2 and 3 also show oil pan X holding oil reservoir R in its usable position. Transmission TM is positioned rearward from oil cooler OC, as shown in FIG. 2. Transmission TM can be a conventional transmission, manual or automatic. Further, FIG. 2 also shows piston seal P rearward from oscillating valve M, and FIG. 3 shows a vent identified by the letter Q centrally within front housing FH, with vent Q assisting the movement of oscillating valve M. FIG. 3 shows most of the same features in FIG. 2, except for transmission TM and ball bearing seal BBS, but without the presence of burning gases E, vortex rings VR1 and VR2, and arrows showing fuel and air flow, so that the structure of combustion chamber C and annular spoilers A1 and A2 can be clearly seen. The vertically extending broken line B–B centrally in FIG. 2 indicates the section illustrated in FIG. 4.

FIG. 4 is a sectional view of main housing MH, looking forwardly toward combustion chamber C. FIG. 4 shows turbine shaft Y centrally positioned within main housing MH with a magnetic seal K1 and a race of ball bearings Z concentric therewith. Cooling chamber CC is positioned immediately above and below turbine shaft Y, with four cooling fins CF extending outwardly beyond cooling chamber CC. The multi-functional cooling fins CF stiffen the casting and cool it. Above turbine shaft Y, FIG. 4 shows blade maintenance access opening TQ with plate T removed to reveal two sets of fastener bores FB used to attach each blade/vane G to rotor or power blade R. Behind the perimeter of main housing MH, exhaust chamber EC would be positioned so as to channel exhaust gases EG to the exhaust pipe W shown extending beyond main housing MH in the upper left part of FIG. 4. Also shown in FIG. 4, are the upper and lower blade access plates S1 and S2, which appear directly above and below blade maintenance access opening TQ. Although not shown, water injection can be added to the present invention to enhance expansion of burning gases as it is turned into high pressure steam.

FIG. 5 shows the most preferred embodiment of the present invention turbine engine having a front housing FH and a main housing MH connected together to form a combustion chamber C (shown in FIG. 2) and contain a rotatable rotor or power blade R (shown in FIG. 2) with blades/vanes G (shown in FIGS. 6 and 7) attached to the periphery of rotor or power blade R, between which rotating exhaust gases EG from combustion chamber C pass to cause a rotation of rotor or power blade R in the same direction. Positioned centrally above combustion chamber C, FIG. 5 shows upper blade maintenance access cover plate S1. Positioned forward from front housing FH, FIG. 5 shows air intake AI, fuel intake F, and the mixing duct MD connected between air intake AI and combustion chamber C that is used as an atomizing chamber for transporting fine particles of fuel/air mixture to combustion chamber C. Positioned forward from air intake AI and its connected mixing duct MD, FIG. 5 shows an overspeed control lever N and front plate FP. Rearward from access plate S1, FIG. 5 shows auxiliary take-off V for accessories (not shown), a cooling fin CF positioned below auxiliary take-off V, chain U within oil cooler OC, and the rear portion of main housing MH that houses transmission TM (shown in FIG. 2). Mounting pads MP for the lightweight and compact present invention turbine engine are shown positioned laterally and rearward from upper blade access plate S1.

FIG. 6 is an enlarged view of several of the adjacently positioned blades/vanes G used in FIG. 1 on the perimeter edge of rotor or power blade R, while FIG. 7 shows a single blade/vane G with its two fastener holes FH and slot SL through which exhaust gases EG pass. The exposed surface of the blade/vane G shown in FIG. 7 with fastener holes FH, is the same exposed surface shown for each blade/vane G in FIG. 6. As shown in FIGS. 6 and 7, the angled distal portion of each present invention blade/vane G overlaps only part of its lower base portion, creating a slot SL through which the rotating exhaust gases EG exiting combustion chamber C pass through to cause rotation of the rotor or power blade R to which the blades/vanes G are attached. The angular shape of the present invention turbine blades/vanes G permits a relatively low rotational speed, approximately six thousand revolutions per minute instead of the approximate forty thousand revolutions per minute required in conventional turbine engines, while at the same time permitting a peripheral speed of rotor or power blade R great enough to create torque of considerable degree. The gas release by volume for one-one-hundredths of a second at one slot SL having a dimension of 0.06 inches by 0.84 inches, would be 0.05 inches. When this is multiplied by one hundred twenty blades/vanes G and one hundred times of release per minute, the torque produced is great.

FIG. 8 shows main housing MH having a substantially circular cross-sectional configuration with turbine shaft Y concentric thereto. Transmission TM is also shown in a concentric position relative to turbine shaft Y and flywheel line FWL, with starter ST typically off to one side. Chain U is shown positioned for rotation by the rotation of turbine shaft Y. Further, FIG. 8 shows the respective upper and lower blade/vane access covers S1 and S2, with exhaust pipe W extending away from the upper end of main housing MH.

What is claimed is:

1. A rotary thermodynamic pressure generator comprising:
   a combustion chamber with two annular spoilers each configured to simultaneously create a vortex ring having laminar flow from a portion of the turbulent premixed air/fuel mixture entering said combustion chamber so as to delay combustion of the portion of air/fuel mixture temporarily preserved in laminar flow;
   air intake means for providing sufficient air to create a lean air/fuel mixture for combustion within said combustion chamber, said air intake means being in fluid communication with said combustion chamber;
   fuel intake means associated with said air intake means and adapted for providing fuel for combustion within said combustion chamber;
   an oscillating valve positioned for controlling flow of said air/fuel mixture into said combustion chamber;
   at least one exhaust chamber in constant fluid communication with said combustion chamber;
   a rotor assembly having a perimeter edge and a plurality of blades depending in 360° array from said perimeter edge, with slots between adjacent ones of said blades and said blades being positioned between said combustion chamber and said exhaust chamber;
   an output shaft associated for rotation with said rotor assembly;
   at least one igniter communicating with said combustion chamber; and
   exhaust means in communication with said at least one exhaust chamber whereby as the remaining turbulent flow that is not peeled off by said two annular spoilers is ignited in said combustion chamber, it expands causing a pressure rise that kills said vortex rings, thereby releasing said laminar air/fuel mixture in said vortex rings to turbulence and supercharging the combustion reaction.

2. The generator of claim 1 wherein said air intake means further comprises a venturi.

3. The generator of claim 1 wherein said air intake means further comprises an air intake and a mixing duct, with said mixing duct positioned between said air intake and said combustion chamber.

4. The generator of claim 1 further comprising at least one air cooling inlet, with said at least one air cooling inlet being selected from a group consisting of cooling air inlets positioned in front of said rotor assembly and air cooling inlets positioned rearward from said rotor assembly.

5. The generator of claim 1 wherein said at least one igniter produces a continuous spark.

6. The generator of claim 1 having two annular spoilers each configured and positioned to each create one of said vortex rings, with said vortex rings having opposite rotation.

7. The generator of claim 1 further comprising at least one blade access opening configured and positioned for blade maintenance and replacement.

8. The generator of claim 1 wherein the exhaust produced is sensible heat.

9. The generator of claim 1 wherein fluid communication between said combustion chamber and said exhaust chamber occurs approximately six hundred times per second.

10. The generator of claim 1 further comprising cooling means selected from a group consisting of cooling fins, air inlets adjacent to said combustion chamber and in fluid communication with said exhaust chamber, and rotating chains moving in part through an oil reservoir.

11. The generator of claim 1 wherein said at least one exhaust chamber comprises a single exhaust chamber in an annular position relative to said rotor assembly and said combustion chamber.

12. The generator of claim 1 further comprising a plurality of magnetic seals associated with said output shaft that are adapted for maintaining output shaft lubrication.

13. A method of using a generator to create rotary thermodynamic pressure, said method comprising the steps of:
   providing a combustion chamber with two annular spoilers each configured to simultaneously create a vortex ring having laminar flow from a portion of air/fuel mixture entering said combustion chamber, air intake means, fuel intake means, an oscillating valve, at least one exhaust chamber, a rotor assembly having a perimeter edge and a plurality of blades depending in 360° array from said perimeter edge, an output shaft, at least one igniter, and exhaust means;

placing said air intake means in fluid communication with said combustion chamber;

associating said fuel intake means with said air intake means;

placing said oscillating valve in a position to control the flow of said air/fuel mixture into said combustion chamber;

placing said exhaust chamber in constant fluid communication with said combustion chamber;

placing said blades on said rotor assembly between said combustion chamber and said exhaust chamber;

placing said output shaft in rotational association with said rotor assembly;

placing said at least one igniter in communication with said combustion chamber; and placing said exhaust means in communication with said at least one exhaust chamber whereby when said oscillating valve allows turbulent premixed air/fuel mixture into said combustion chamber, said at least one annular spoiler peels off some of the air/fuel mixture into laminar flow in the form of at least one vortex ring for delayed combustion, and as the remaining turbulent flow is ignited it expands causing more air/fuel mixture to be brought into said combustion chamber which increases the size of said at least one vortex ring, eventually ring formation ceases and fuel therein ignites, supercharging the combustion reaction and forcing the exploding gases to pass through said slots between said blades attached to said rotor assembly, moving said rotor, and said output shaft attached to said rotor assembly, with the void created by expanding gases causing said oscillating valve to again move to allow a fresh charge of premixed air/fuel mixture into said combustion chamber for the next combustion event until no fuel remains available for combustion.

14. The method of claim 13 wherein said steps of placing said air intake means in fluid communication with said combustion chamber, associating said fuel intake means with said air intake means, placing said oscillating valve in a position to control the flow of said air/fuel mixture into said combustion chamber, placing said exhaust chamber in constant fluid communication with said combustion chamber, placing said blades on said rotor assembly between said combustion chamber and said exhaust chamber, placing said output shaft in rotational association with said rotor assembly, placing said at least one igniter in communication with said combustion chamber, and placing said exhaust means in communication with said at least one exhaust chamber are interchangeable.

15. The method of claim 13 wherein said air intake means further comprises a venturi.

16. The method of claim 13 wherein said at least one igniter produces a continuous spark.

17. The method of claim 13 wherein two annular spoilers are provided and said annular spoilers are each configured and positioned to each create one of said vortex rings, with said vortex rings having opposite rotation.

18. The method of claim 13 wherein the exhaust produced is sensible heat.

19. The method of claim 13 wherein the number of said combustion events occurring per second is approximately six hundred, creating the effect of said constant fluid communication between said combustion chamber and said exhaust chamber.

20. The method of claim 13 wherein said at least one exhaust chamber comprises a single exhaust chamber in an annular position relative to said rotor assembly and said combustion chamber.

* * * * *